United States Patent [19]

Roman

[11] Patent Number: 4,502,840
[45] Date of Patent: Mar. 5, 1985

[54] BLADE PITCH CONTROL IN ROTATABLE BLADED DEVICES FOR VEHICLES

[76] Inventor: Stephan Roman, 81 Beardsley Rd., Shelton, Conn. 06484

[21] Appl. No.: 360,072

[22] Filed: Mar. 19, 1982

[51] Int. Cl.³ .............................................. B64C 27/38
[52] U.S. Cl. .................................... 416/114; 416/138; 416/157 R; 416/168 R
[58] Field of Search ............... 416/158, 115, 168, 114, 416/138, 157, 141

[56] References Cited

U.S. PATENT DOCUMENTS

| | | | |
|---|---|---|---|
| 2,439,089 | 4/1948 | Hodson | 416/114 |
| 2,677,429 | 5/1954 | Laufer | 416/114 |
| 3,199,601 | 8/1965 | Dean et al. | 416/114 X |
| 4,227,856 | 10/1980 | Verrill et al. | 416/114 X |
| 4,297,080 | 10/1981 | Krauss et al. | 416/114 X |
| 4,340,335 | 7/1982 | Cheney | 416/141 X |
| 4,360,337 | 11/1982 | Frommlet et al. | 416/138 X |

FOREIGN PATENT DOCUMENTS

| | | | |
|---|---|---|---|
| 2756071 | 7/1978 | Fed. Rep. of Germany | 416/134 A |
| 595987 | 12/1947 | United Kingdom | 416/115 |

Primary Examiner—Everette A. Powell, Jr.
Attorney, Agent, or Firm—Eugene Chovanes

[57] ABSTRACT

A rotatable bladed device for vehicles, such as especially a helicopter rotor, which has its blade pitch controlled by a setup which includes a swash plate setup controlled by a set of hydraulic actuators and the particular swash plate setup position and attitude in turn controls the blade pitch by a plurality of rods pivoted together at one end at one particular point movable longitudinally of the rotor axis, one of which rods has its other end pivoted at a point on the pitch arm by which it controls pitch and another of which rods is also pivoted at a point fixed by the rotational position at any particular time of the rotor hub.

11 Claims, 11 Drawing Figures

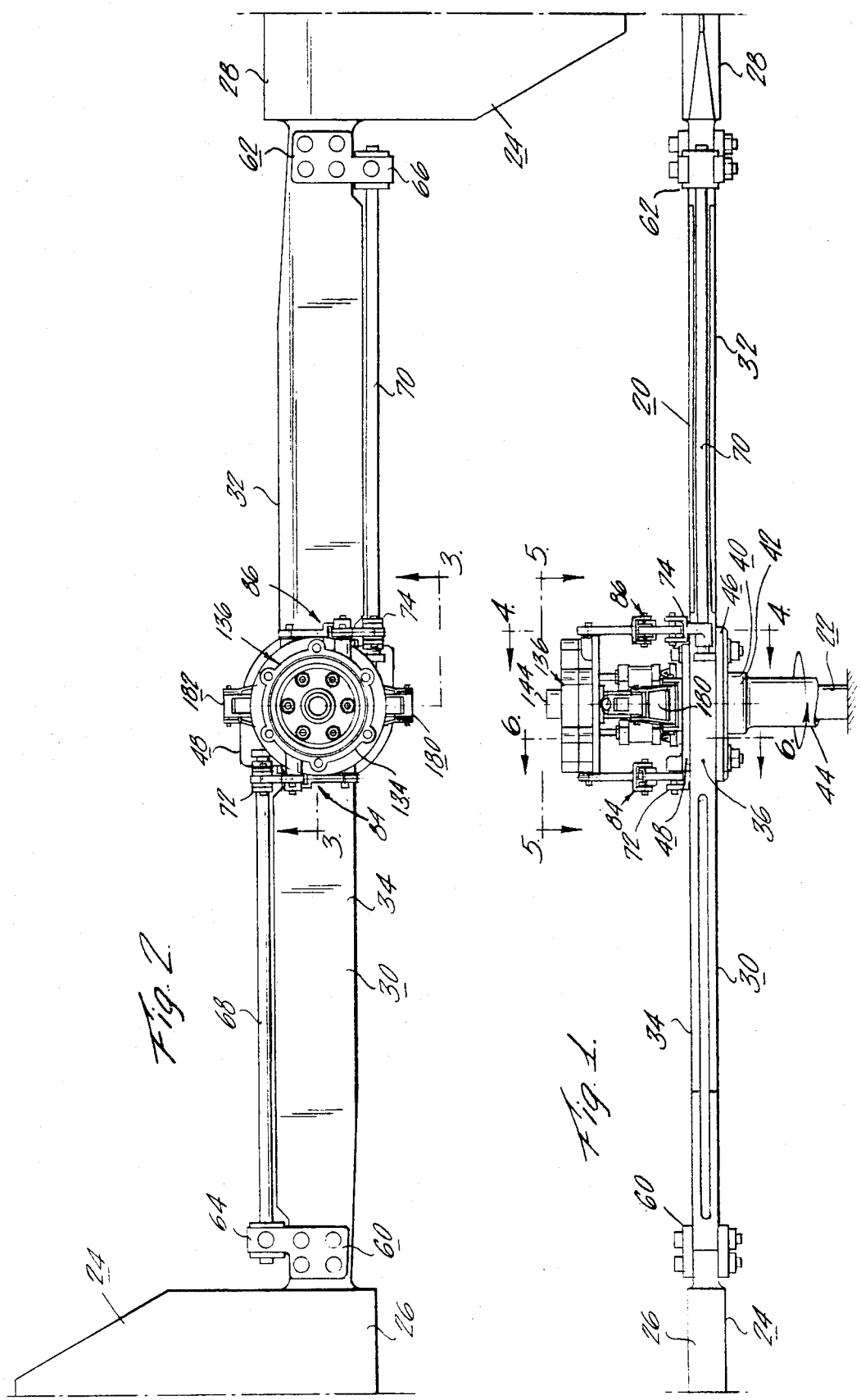

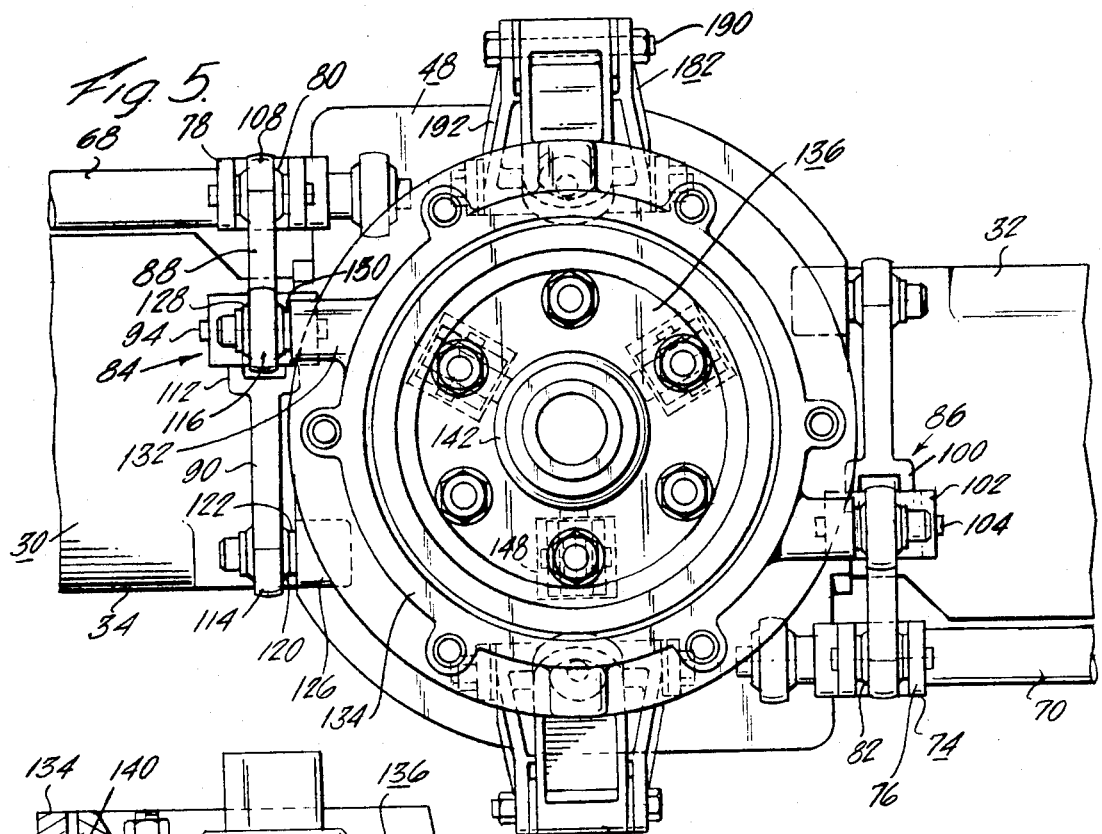
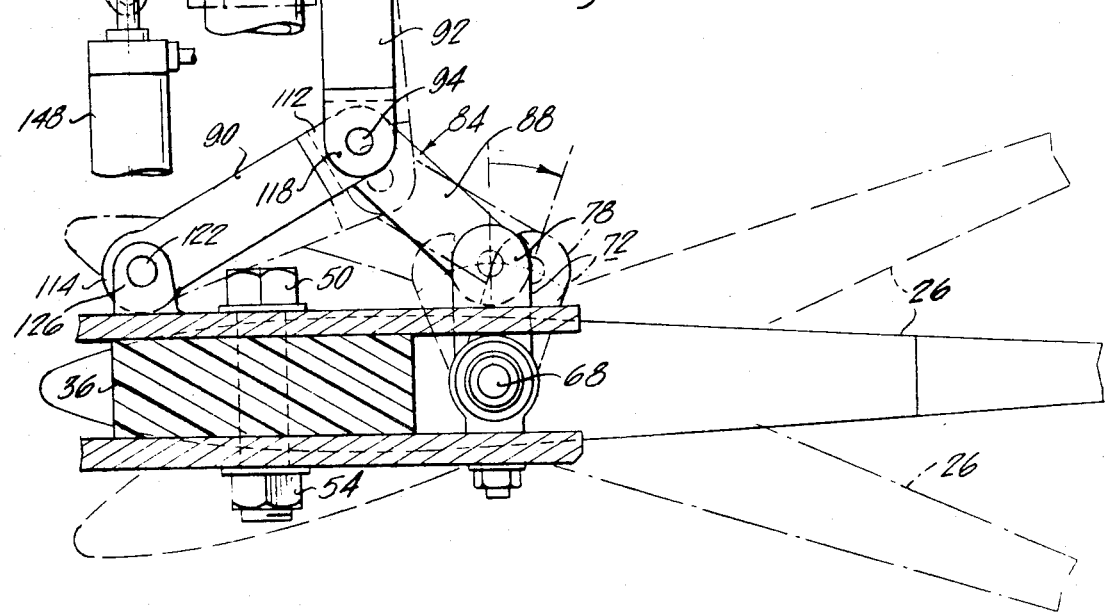

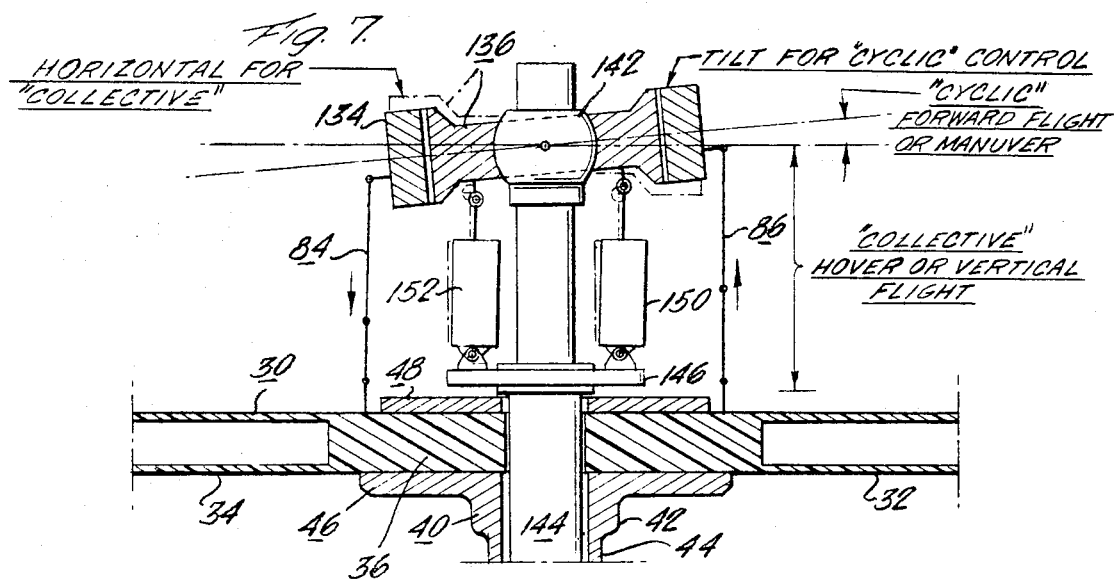
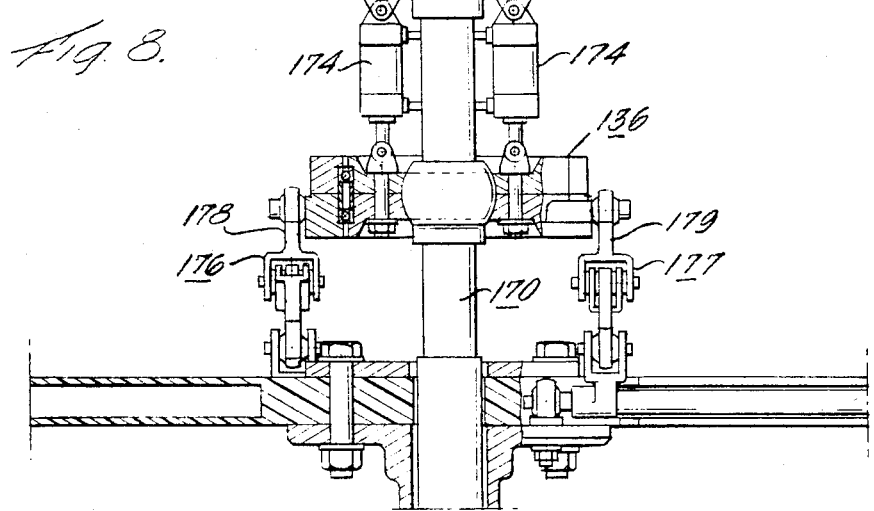
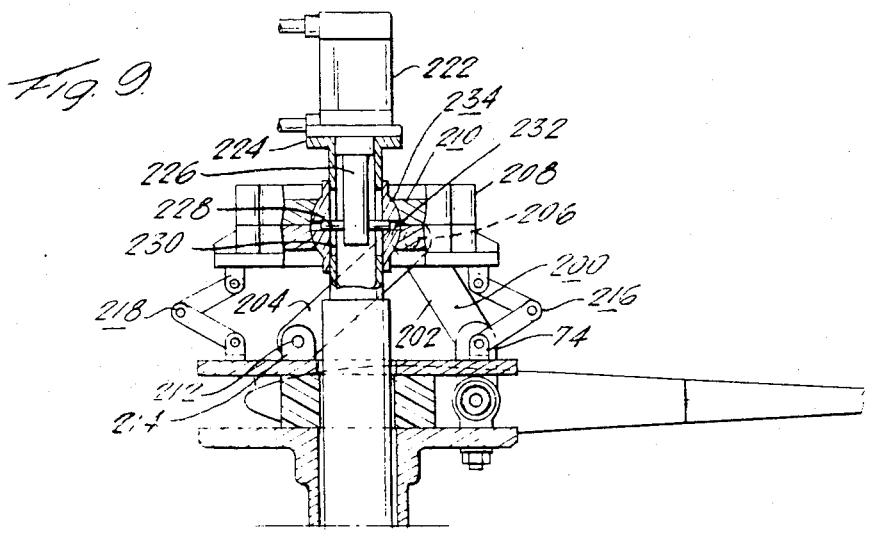

ment shows the setup as it would be with a rotor having just two blades.

FIG. 2 is a plan view of what is shown in FIG. 1.

Figure 3:
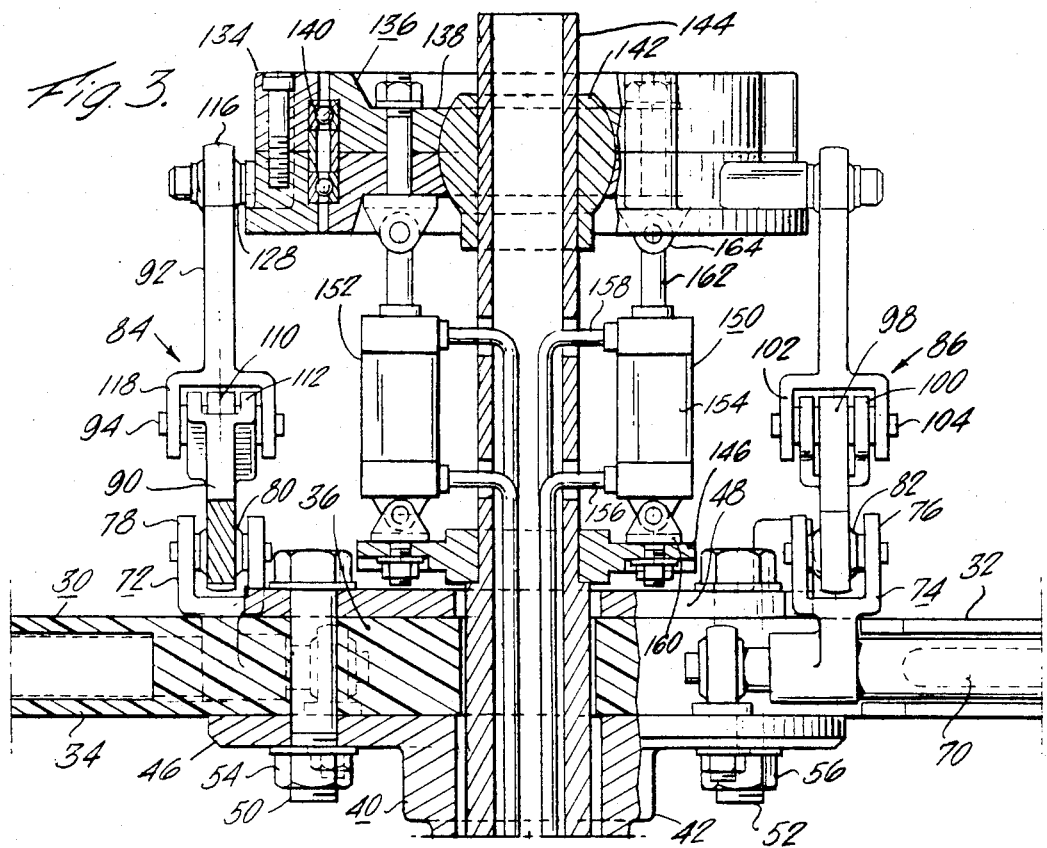
FIG. 3 is an enlarged elevational view of the central portion of what is shown in FIGS. 1 and 2, taken in the same direction as FIG. 1, broken away through the greater part of its extent to also show a vertical section.
Figure 4:
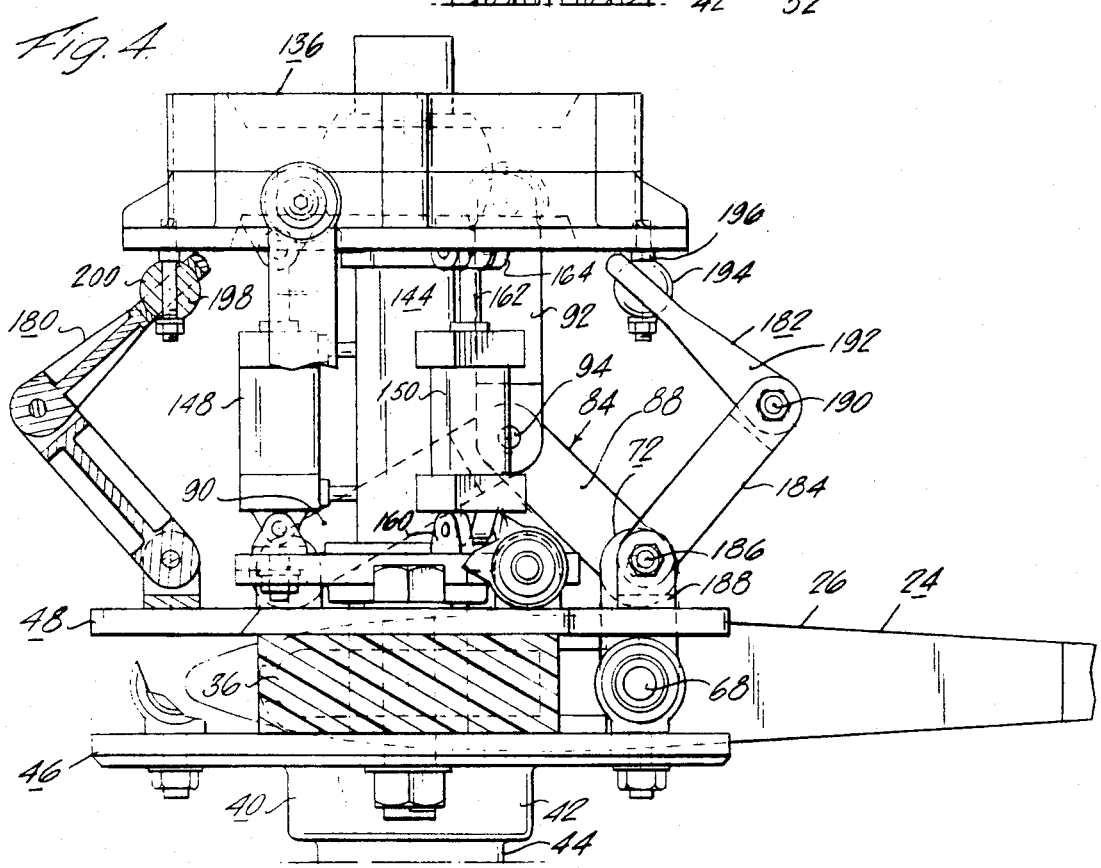

FIG. 4 is a view of the same part of the rotor as FIG. 3, but taken in a direction longitudinally of the extent of the flexible straps and blades of the rotor, along the line 4—4 of FIG. 1, and being elevational in its showing on the right side of the central portion of the rotor, with cross section through the flexible strap and broken away on most of the left side to show only part of the pivoted rod setup there and to show the scissors structure there in longitudinal section.

FIG. 5 is a plan view of what is shown in FIGS. 3 and 4, taken along the line 5—5 in FIG. 1, and with the rotor itself shown in a position in which the portion which is shown stretches across from side to side of the plan view.

FIG. 6 is a view like that of FIG. 4, taken at a position further along the rotor in the same direction as that of FIG. 4, but broken away so that it does not show fully the swash plate setup, the support setup, or the hydraulic actuator setup.

FIG. 7 is a showing of the same embodiment as found in FIGS. 1 through 6, taken in a direction to show the central part of the rotor extending with the length of its flexible strap across the view, the view being partly elevational, but showing swash plate and hub and flexible strap in longitudinal section and showing the pivoted rod setup and the connections between the actuator and swash plate schematically, with text and showing being designed to distinguish between collective and cyclic control.

FIG. 8 is a view more or less like FIG. 7, but with the schematic features being instead representational showings and with it being elevational on the right where FIG. 7 is sectional, and shows a somewhat varied embodiment as compared to that of FIGS. 1 through 7.

FIG. 9 is a showing of still a third embodiment, one which would be especially intended for a setup in which there was solely collective pitch control, such as might for example be especially likely to be used for an airplane propeller, and is a cross-sectional view of the rotor taken in a direction lengthwise of the flexible strap and blade from a point behind the central portion, but broken away to show a central cross section in the central part of the swash plate and to show the stationary support for that swash plate, mainly in elevation.

Figure 10:
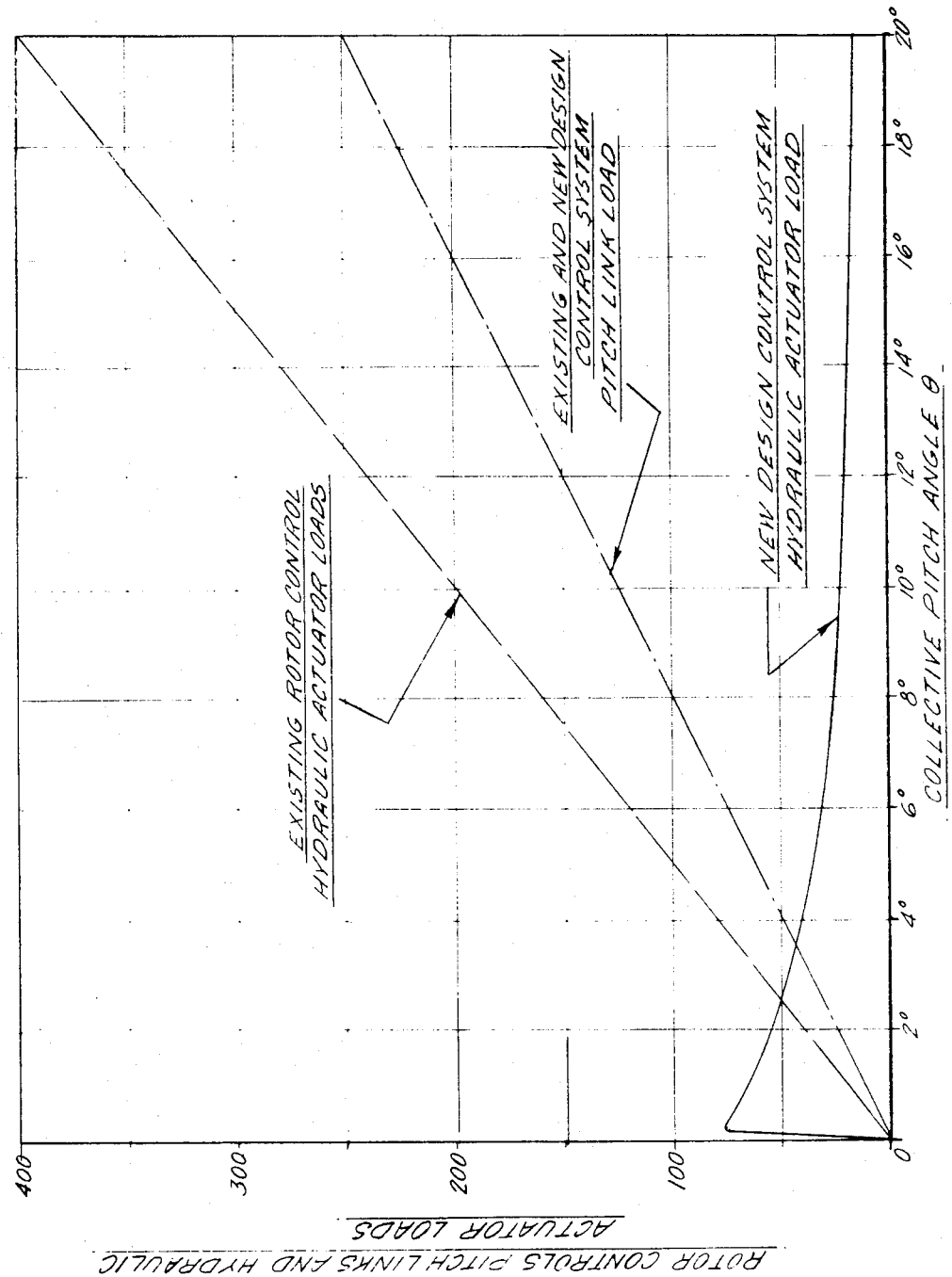

FIG. 10 is a graph showing sample calculated values of pitch link loads against collective pitch angles and hydraulic actuator loads against collective pitch angles both for the system of the invention and for its nearest possible counterpart which lacks its special advantage. The calculation is based on an assumption that both systems would have a similar set of pitch link loads of a reasonable value and shows what the comparative hydraulic actuator loads in such a situation would be as between the two systems.

Figure 11:
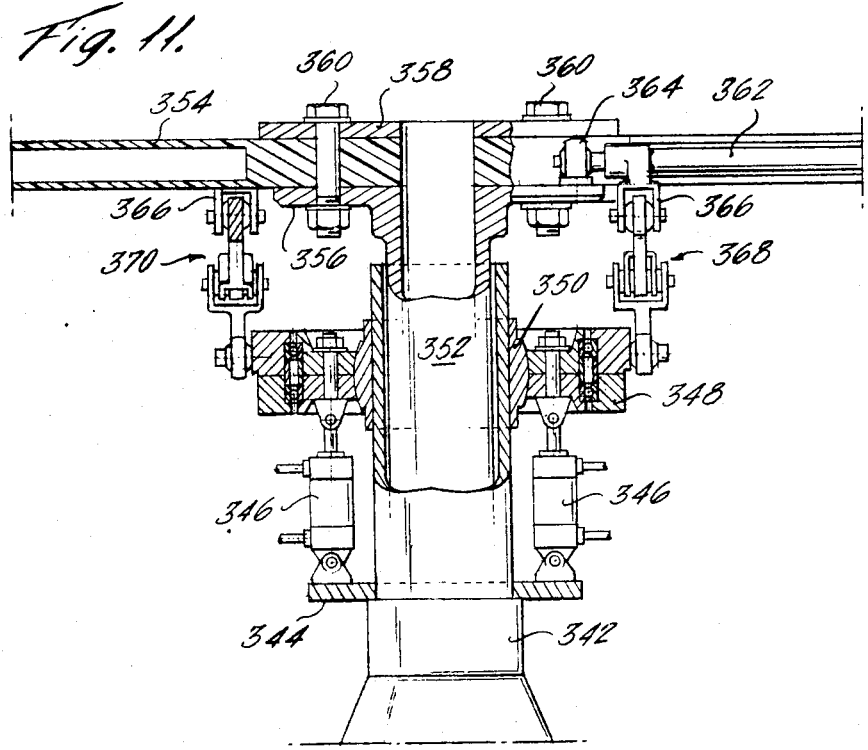

FIG. 11 is a similarly schematic fragmentary elevational view with parts broken away, showing another modification wherein the rotor controls are located below the rotor hub. This view is similar to the view of FIG. 8.

BLADE PITCH CONTROL IN ROTATABLE BLADED DEVICES FOR VEHICLES

SUMMARY OF THE INVENTION

The present invention has to do with blade pitch control in rotatable bladed devices for vehicles. Such rotatable bladed devices for vehicles include especially rotary wings such as found for example on helicopters, in both their main and tail rotors, vertical takeoff and landing aircraft, short takeoff and landing aircraft, and autogyros, this not being necessarily an exclusive enumeration. They also include propellers such as found for example on many conventional airplanes and at least traditionally on most if not all airships, as well as for propulsion on air cushion vehicles and hydroplanes. The present invention would also prove useful for screw propellers for ships and boats and in rotatable bladed devices intended to generate and maintain the air stream or streams which an air cushion vehicle uses to give it a position up in the air at least somewhat off the ground or water, or at least with minimum or little effective contact with ground or water.

A distinctive aspect of the present invention is that, in an overall setup which includes various other features which also contribute to the overall result, it includes as part of the overall control for the blade pitch of a rotary bladed device for vehicles, a particular setup in which a plurality of rods are pivoted together at a point which is movable in the longitudinal direction involved in the axis of rotation of the rotary bladed device, with one of the rods being also pivoted at another point which is fixed relatively to the particular rotational position at any given time of the hub of the rotary bladed device, and another one of the rods being pivoted at another point which at any given time determines the pitch at that time of at least one blade of the rotary bladed device.

A purpose of the present invention is to provide a setup for control of the pitch of a rotatable bladed device for a vehicle which setup has an unusually low maximum load on a hydraulic actuator or the like to secure a given maximum pitch, considering the actuator stroke involved.

A further purpose of the present invention is to substantially reduce the overall size and weight required of the apparatus for control of the pitch of a rotatable bladed device for a vehicle.

A further purpose of the present invention is substantially to reduce any problem of anchoring within the body of the helicopter, the pitch control system for any rotary wing and thereby to simplify the overall construction, reduce the weight of the body of the helicopter, and increase the relative accessibility of any interior portions of the pitch control setup and other interior construction associated with it.

Other purposes will appear in the rest of the description and the claims.

SHORT DESCRIPTION OF THE DRAWINGS

FIG. 1 is an elevational view of the more central portion of a particular embodiment of the rotor of the invention, taken from a direction which shows the rotor flexible straps and blades extending across the view, including the pitch control setup insofar as it is visible, and broken away to omit the greater part of the blades of the rotor and the lower portion of the rotary and stationary support columns. This illustrative embodi-

DETAILED DESCRIPTION OF THE INVENTION

Describing in illustration and not in limitation and referring to the drawings, the most preferred embodiment of the invention is that found in FIGS. 1 through 7, which embodiment also has FIG. 10 applicable to it as well as to the other embodiments. What is essentially involved in this embodiment, and also that of FIG. 8, is a rotatable bladed device, together with control and supporting structure, such as would for example be found in the main rotor of a helicopter and would also be involved in any similarly functioning devices involving rotary wings which like that main rotor would have both collective pitch aspects and cyclic pitch aspects in the pitch of their blades.

In this particular most preferred form, there is a part of the overall device which is specifically a rotatable bladed device 20, and a part of the device which is stationary as far as rotation is concerned relative to the rest of the helicopter or other flying vehicle, and thus serves at least to a large extent to function as something that has a support relationship both to the rotatable bladed device and the rest of the flying vehicle such as the fuselage, which stationary part is designated in the drawings as 22. There are also control features, some of which are rotating more or less with the rotatable device and thus in effect form part of the rotatable device, and some of which are more or less stationary from the rotating standpoint relative to the rest of the helicopter or other flying vehicle and thus might be thought to form part of the stationary support setup, although their function or at least their main function has to do with control rather than support.

The rotatable wing includes blades 24, which in this particular illustrative form are shown as involving two particular blades 26 and 28,—although the invention can quite readily be used with rotatable wings which have for example four or more blades. The rotatable wing also includes flex strap 30, which in the form shown is structurally really one particular flex strap having a part extending in one direction from the center, 32, and a part extending in the other direction from the center, 34, and a mid-part 36, although it would be perfectly possible to have more flex straps with my particular invention such as for example having a four-bladed rotary wing in which there were two interrelated flex straps each extending all the way across between pairs of blades, and no doubt a construction could be used in which each particular blade had its own flex strap.

Also included in the rotary wing in the most preferred form is central hub structure 40, which in the embodiment shown includes not only hub proper 42, but also central outer tube 44 extending downward from it, and plate 46 at its top. This plate, along with separate plate 48 on the other side of the flex strap 30 and bolts such as bolts 50 and 52 extending between them and held on by nuts 54 and 56, serves to clamp the flex strap to the hub structure, so that it and the hub structure and the blades all rotate together.

As is already of course well known in the case of the main rotating wing of helicopters, for example, control of various aspects of the functioning of the helicopter can be secured by purposeful variation of the pitch at any given time of the particular blades of that rotating wing of that helicopter, and that is specifically intended in the case of my invention. As part of the main rotatable wing, blades 26 and 28 and flex strap 30 at the respective opposite ends of the flex strap are held together by respective dual-plate-and-rivet structures 60 and 62, whose plates have respective transverse projections 64 and 66 beyond the trailing edges of the respective portions of the flex strap. Respective blade pitch shafts 68 and 70, running along behind and parallel to these respective trailing edges, have their end portions riveted in between these plate projections, so that, bearing in mind the flexibility of the flex strap, the rotational positions of the respective pitch shafts control the pitch angles assumed by the respective ends of the flex straps and by the blades attached thereto.

Control over the rotational positions of the respective pitch shafts comes in each case from the inboard end of the shaft, by means of the respective blade pitch arms 72 and 74 attached to those inboard ends and extending out perpendicularly from those pitch shafts in a direction which, where the pitch angle of the blades is 0°, extends perpendicularly upward relative to flex shaft and blade.

On the ends of these pitch arms are respective yokes 76 and 78, mounting respective uni-balls 80 and 82. Each of these uni-balls constitutes one of the peripheral pivots of a particular pivot-and-rod setup - pivot-and-rod setup 84 in the case of uni-ball 80, and pivot-and-rod setup 86 in the case of uni-ball 82.

In pivot-and-rod setup 84, three rods (or arms or bars)—88, 90 and 92 respectively,—are all pivotally movably held together at a relatively central point 94 in the pivot-and-rod setup. At this point, each rod has an eye (or ring) setup at one of its ends. Each of these three eye setups surrounds the same cross pin 96, which is relatively small in diameter at its ends, and larger in diameter in its intermediate portions. The eye setups include a central one relative to the length of the pin, which is a single eye, and two surrounding ones, each involving a dual eye mounted on the ends of a yoke. The detail of this type of pivot and eye arrangement for the three rods pivotally movably mounted around the one pivot at the one rather central point in the pivot-and-rod setup, is perhaps best understood from looking at the correspondingly constructed pivot-and-rod setup 86 at the right hand side of FIG. 3, where single central eye 98, double intermediate eye 100, and double outer eye 102 are all mounted on the single pin 104, with capability of part-way rotation around that pin, depending of course upon how far the overall construction permits the various particular rods or arms to travel in any such rotary motion.

More particularly as to the rods or arms in pivot-and-rod setup 84: arm 88 extends between eye 108 constituting its end element peripheral to the pivot-and-rod setup, which end element rides on uni-ball 80, on the one hand, and eye 110, which is one of the eye setups located at the relatively central point 94; arm 90 extends between its relatively central double eye 112 and its peripheral eye 114; and arm 92 extends between peripheral eye 116 and relatively central double eye 118. Thus pivot-and-rod setup 84 consists of three rods each having a single eye at the peripheral end and a single or double eye all pivoted around the same pin at their other ends at a point which is relatively central to the entire pivot-and-rod setup. As will be evident from the drawings, pivot-and-rod setup 86 has a corresponding construction.

Eye 114 at the peripheral end of arm 90 is pivotally mounted on uni-ball 120, which in turn is mounted on axial shaft 122, extending off to one side, and journalling in bracket 126 on separate plate 48 which helps to clamp the flex strap to the hub structure. Thus bracket 126 and the uni-ball mounted in it are in a rotational position on the helicopter as a whole which rotational position is determined by the rotational position of that entire half of the main rotatable wing of the helicopter of which they form a part,—the half in question being the half that includes blade 26.

Eye 116 at the peripheral end of arm 92 is pivotally mounted on uni-ball 128, which itself is mounted on shaft 130 extending off to one side along the axis of the uni-ball and journalling in bracket 132, which in turn is mounted on the rotatable peripherally outer part 134 of swash plate 136.

Pivot-and-rod setup 86 is identically constituted and mounted, on corresponding uni-balls, etc.

Swash plate 136 also has an inner stationary part 138 on the outer circular edge of which its rotatable part is mounted by means of ball bearing setup 140. Swash plate 136 rides by means of a socket on large inner ball 142, which in turn is mounted to ride vertically up and down on stationary support tube 144, the rotational position of the inner ball being kept unchanged by means of a vertical spline and keyway (not shown in either case) respectively on the exterior of the support tube and interior of the ball member. Stationary support tube extends down into the interior of the helicopter through the central hub structure 40 to a place (not shown) in the interior of the helicopter where it is suitably mounted to fulfill its stationary supporting function.

Partway up on the stationary support tube is a circular step in its structure, as will be seen in FIG. 3, and on this step is mounted collar plate 146, on which are mounted three vertical hydraulic actuators 148, 150, and 152, respectively, in equispaced position around the stationary support tube. In each case, the hydraulic actuator consists of a cylinder such as 154, a piston (not shown) inside of it, and suitable tubes such as 156 and 158 to either side of the piston, each having controlled communication with a hydraulic power source, as well as a lower pivotal mounting such as 160 by which it is suitably mounted on the collar plate, and an upper rod 162 extending from the piston to an upper pivotal mounting such as 164 by which it furnishes the support for one point on the nonrotating part of the swash plate. Thus the three hydraulic actuators, by operation of control for their hydraulic fluid, can collectively control both the collective vertical position of the swash plate and its angular position, both collectively and cyclically.

As shown especially in FIG. 4, two scissors setups, 180 and 182 respectively, on opposite sides of the rotating wing, extend from top plate 48 up to swash plate 136, being of identical construction to each other. In each case, the lower arm, such as 184, is pivotally mounted at 186 by means of a bracket such as 188 on the plate. A pivot such as 190 at the upper end of the lower arm enables its pivotal attachment to the lower end of the upper arm such as 192. At the upper end of that upper arm, it is movably mounted on a small ball such as 194, which in turn is mounted on the swash plate by a pin such as 196 which extends through its interior and around which it can rotate. (The particular construction of ball and pin are best shown as 198 and 200 in the section at the left in FIG. 4.)

FIG. 8 shows a different embodiment, in which the stationary support setup 170 will be seen to extend up through the ball setup to a substantially greater distance above the swash plate 136, the collar plate 172 is above the swash plate rather than below it, the hydraulic actuator setup 174 extends downward to the swash plate rather than upward to it, the swash plate is thus enabled to be closer to the flex straps, etc. than in the previously described form, and the pivot-and-rod setups 176 and 177 can thus be in more compact form, on account of having shorter top rods 178 and 179 respectively.

The embodiment of FIG. 9, which as already indicated is suitable for a rotatable wing which has no cyclic angular blade variation, but only collective, or for example for a propeller or the like, in which a similar condition prevails, is simpler than the foregoing embodiments in various respects as will be evident from FIG. 9. As will be there seen, pivot-and-rod setup in this form is in each case a two-arm setup such as 200. (For purposes of simplicity, the drawing is so sectioned as to show only one of the two pivot-and-rod setups, and only the one blade whose angle is controlled by it.) In it, arms 202 and 204, corresponding to the two lower arms of the other forms, are pivoted together at a point 206 directly pivotally mounted in some suitable way on the rotatable outer portion 208 of swash plate 210, so that no top arm is required. At that pivot point 206 and also the two lower pivot points—212 in bracket 214 at the lower left of FIG. 9 and the pivot point at the top of the blade pitch arm 74, which pivot point is hidden by the lower part of the scissors 216 - pins instead of uni-balls are used, and a pin instead of a ball is likewise used at the top pivots of scissors 216 and 218. The hydraulic actuator setup consists of a single hydraulic actuator 222, whose piston and cylinder is located at the very top of the stationary support setup 224, with an arm 226 extending down from the piston to the through cross pin 228, which extends through vertical grooves 230 into cross holes 232 in the interior of ball setup 234, thus enabling the hydraulic actuator to control the vertical movement of the swash plate and thereby the angular movement of the blade pitch arm, and thus of course the angular position of the blade pitch shaft, flex strap and blade.

In this form of FIG. 9, scissors 216 and scissors 218 can if desired be dispensed with, since the purpose of these in any form is at least chiefly to maintain at least reasonable correspondence in rotational position between the rotatable part of the swash plate, on the one hand, and the hub setup, flex straps and blades, etc., on the other, and in this form of FIG. 9, with its two-rod pivot-and-rod setups, when fully assembled together so that the pivot to the swash plate is attached, this reasonable correspondence will be assured without the scissors.

FIG. 11 illustrates a further modification in which all the rotor controls lie beneath the rotor blades. Hollow cylindrical segment of a stationary stack 342 has a lower portion attached to the transmission housing (not shown). The upper terminal end of stack 342 has a reduced diameter over which a hydraulic actuator support disk 344 is placed. Disk 344 comes to rest on a shoulder of the stationary stack 342, about which it is fixed such as by spot welding. Three hydraulic cylinders 346 are pivotally mounted on disk 344, on 120° centers.

The stationary stack 342 carries upon its upper terminal reduced end portion a swash plate 348 mounted for vertical sliding and angular adjustment by means of a central compound bearing 350. The actuator ends of the hydraulic cylinders 346 are pivotally attached to the swash plate 348.

Positioned centrally within the central bore of the stationary stack 342 is a rotor shaft 352 having an upper terminal end forming a mounting flange 356 upon which a flex strap 354 is positioned and securely mounted between the mounting flange 356 and an upper mounting plate 358 by means of mounting bolts 360.

Immediately adjacent the trailing edge of the right and left portions of the flex strap are blade pitch shafts 362 whose inner terminal ends are carried in spherical mounting bearings 364. Each pitch shaft has mounted adjacent its mounting bearing 364 an actuator arm 366 whose outer bifercated end is pivotally connected to the swash plate 348 by means of linkages 368 and 370.

The use and function of the above identified components are identical to the apparatus already described in detail for FIGS. 1 through 9. In this embodiment, the rotor is positioned above the rotor controls.

The operation of the foregoing type of device will actually be readily understood from the description of the various embodiments here portrayed, so that no more particular description relative to it is actually required, but as a precaution a certain amount of additional description relative to it will be made here.

When the helicopter or other vehicle is in use, the particular pitch angle of the blades at any particular time becomes important. This fact is of course already very well known in the art, and therefore will not be gone into further here.

To take a very simple generalized case as a fundamental illustration of the basic mode or operation of the control sytem, suppose a helicopter which includes the control setup of FIGS. 1 through 7 happens to be simply standing idle on the ground with its blades at 0° inclination, and it is desired to give those blade a positive angle of inclination which will enable the rotatable wing to exert a pull on the rest of the helicopter when that wing is rotating,—something that must of course necessarily occur on every occasion the helicopter is used for flight in order for that use to take place, if the rotatable wing is brought back to standing position with its blades at 0° inclination in between the times the helicopter is used. By "positive angle of inclination" is of course meant an angle when the wing is rotating in which the forward edge of the blade in the direction of rotation is higher than its trailing edge, so that the central cross-sectional line of the blade slopes upward from the trailing to the leading edge.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

Having thus described my invention, what I claim as new and desire to secure by Letters Patent is:

1. In an aircraft having rotatable blades,
    (a) a stationary support, having a longitudinal axis, in the aircraft;
    (b) a rotor journalled on the stationary support;
    (c) blade supports mounted on and extending radially outward from the rotor;
    (d) a blade connected to the outward end of each blade support; and
    (e) means for varying the pitch angle of each of the blades comprising:
    a swash plate
        movably mounted on, and extending radially outward from the stationary support in a plane of rotation generally transverse to the longitudinal axis of the stationary support, and
        having a non-rotating inner portion mounted on the stationary support and a rotatable peripheral outer portion, journalled on, and radially outward of, the inner portion;
    means for controllably varying the plane of rotation of the swash plate with respect to the axis of the support; and
    a connection between the rotatable portion of the swash plate and the blade support comprising a toggle joint having at least two links connected pivotally at a first pivot; one of the links being operatively connected to the blade support; the other link being pivotally anchored at a point remote from the first pivot to the rotor, and a connection between the first pivot and the rotatable portion of the swash plate.

2. The device of claim 1 wherein the blade support is a flex strap.

3. The device of claim 2 wherein the means for varying the pitch angle of the blade includes a torsion bar connected to the one link at one end of the bar, and connected to the flex strap at the other end of the bar, wherein the flex strap can be twisted.

4. The device of claim 2 in combination with scissor links extending between the swash plate rotatable portion and the rotor, for driving the swash plate rotatable portion from the rotor.

5. In an aircraft having rotatable blades,
    (a) a stationary support, having a longitudinal axis, in the aircraft;
    (b) a rotor journalled on the stationary support;
    (c) blade supports mounted on and extending radially outward from the rotor;
    (d) a blade connected to the outward end of each blade support; and
    (e) means for varying the pitch angle of each of the blades comprising:
    a swash plate
        movably mounted on, and extending radially outward from the stationary support in a plane of rotation generally transverse to the longitudinal axis of the stationary support, and
        having a non-rotating inner portion mounted on the stationary support and a rotatable peripheral outer portion, journalled on, and radially outward of, the inner portion;
    means for controllably varying the plane of rotation of the swash plate with respect to the axis of the support; and
    a connection between the rotatable portion of the swash plate and the blade support comprising a toggle joint having three links connected at their inner ends in Y fashion pivotally at the center of the Y; the first link being connected at its outer end to the rotatable outer peripheral portion of the swash plate; the second link being connected at its outer end to the blade support; and the third link anchored at its outer end to the rotor.

6. The device of claim 5 wherein the blade support is a flex strap.

7. The device of claim 4 wherein the means for varying the pitch angle of the blade includes a torsion bar connected to the second link at one end of the bar, and connected to the flex strap at the other end of the bar, wherein the flex strap can be twisted.

8. The device of claim 7 in combination with scissor links extending between the swash plate rotatable portion and the rotor for driving the swash plate rotatable portion from the rotor.

9. In an aircraft having rotatable blades,
(a) a stationary support, having a longitudinal axis, in the aircraft;
(b) a rotor journalled on the stationary support;
(c) flex straps fixed to, and extending radially outward from the rotor;
(d) a blade connected to the outward end of each flex strap;
(e) a torsion bar extending from a point near the inward end of the flex strap to the outward end of the strap and connected thereto; and
(f) means for varying the pitch angle of each of the blades comprising:
a swash plate
movably mounted on, and extending radially outward from the stationary support in a plane of rotation generally transverse to the longitudinal axis of the stationary support, and
having a non-rotating inner portion movably mounted on the stationary support and a rotatable peripheral outer portion, journalled on, and radially outward of, the inner portion;
means for controllably varying the plane of rotation of the swash plate with respect to the axis of the support; and
a connection between the rotatable portion of the swash plate and the blade support comprising a toggle joint having three links connected at their inner ends in Y fashion pivotally at the center of the Y; the first link being pivotally connected at its outer end to the rotatable outer peripheral portion of the swash plate; the second link being connected at its outer end to the inner end of the torsion bar; and the third link anchored at its outer end to the rotor.

10. The device of claim 9 wherein the means for controllably varying the plane of rotation of the swash plate with respect to the axis of the support includes hydraulic cylinders extending between the non-rotating inner portion of the swash plate and the stationary support, and controls for varying the hydraulic pressure in the cylinders, whereby the swash plate can be repeatedly, and constantly, and reversibly tilted with respect to the stationary support as the blades rotate.

11. The device of claim 10 in combination with scissor links extending between, and pivotally connected to the rotor and the rotatable portion of the swash plate for driving the rotatable portion of the swash plate from the rotor.

* * * * *